(12) United States Patent
Varadharajan et al.

(10) Patent No.: US 10,438,168 B2
(45) Date of Patent: Oct. 8, 2019

(54) FACILITATING DYNAMIC CUSTOMIZATION OF REPORTING TOOLS IN AN ON-DEMAND SERVICES ENVIRONMENT

(71) Applicant: salesforce.com, inc., San Francisco, CA (US)

(72) Inventors: Arunkumaran Varadharajan, Dublin, CA (US); Catherine Block Daves, Oakland, CA (US); Daniel Scott Perry, New Westminster (CA); Garrett George Kiel, San Francisco, CA (US); Chuqiao Zha, San Francisco, CA (US); Khushboo Shah, San Mateo, CA (US); Linh Pham, San Francisco, CA (US); Patrick Yu Pang Louie, San Francisco, CA (US); Srividhya Agandeswaran, San Ramon, CA (US); Stefan Eberl, San Francisco, CA (US); Sulabh Bansal, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 1050 days.

(21) Appl. No.: 14/692,194

(22) Filed: Apr. 21, 2015

(65) Prior Publication Data
US 2016/0103585 A1    Apr. 14, 2016

Related U.S. Application Data

(60) Provisional application No. 62/062,721, filed on Oct. 10, 2014.

(51) Int. Cl.
*G06Q 10/10*   (2012.01)
*G06F 16/2457*   (2019.01)

(52) U.S. Cl.
CPC ....... *G06Q 10/10* (2013.01); *G06F 16/24575* (2019.01)

(58) Field of Classification Search
CPC ............ G06F 3/04842; G06F 3/04817; G06F 3/0482; G06F 16/24575; G06Q 10/10
See application file for complete search history.

(56) References Cited

U.S. PATENT DOCUMENTS 5,577,188 A   11/1996 Zhu
5,608,872 A    3/1997 Schwartz et al.
(Continued)

*Primary Examiner* — William L Bashore
*Assistant Examiner* — Gregory A Distefano
(74) *Attorney, Agent, or Firm* — Jaffery, Watson, Mendonsa & Hamilton, LLP

(57) ABSTRACT

In accordance with embodiments, there are provided mechanisms and methods for facilitating dynamic customization of reporting tools in an on-demand services environment in a multi-tenant environment according to one embodiment. In one embodiment and by way of example, a method includes importing, by a database system, a first application from a computing system associated with a third-party entity, where the first application is associated with the third-party entity and first one or more reporting forms of a plurality of reporting forms. The method may further include integrating, by the database system, the first application with a second application to generate an integrated application, where the second application includes a local application and is independent of the first application. The second application may be associated with second one or more reporting forms of the plurality of reporting forms. The method may further include associating, by the database system, a set of integrated properties of the integrated application with a reporting tool, and displaying, by a display device, the reporting tool to be used to facilitate building of one or more reports based on the set of integrated (Continued)

properties, where the one or more reports include at least one of the first and second one or more reporting forms.

21 Claims, 9 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 7,720,809 B2 * | 5/2010 | Knudsen .......... G06Q 30/08 705/26.3 |
| 8,418,165 B2 * | 4/2013 | Hoff .......... G06F 8/61 717/168 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0141153 A1 * | 6/2008 | Samson .......... G06F 3/0481 715/769 |
| 2009/0177744 A1 | 7/2009 | Marlow et al. |
| 2012/0246623 A1 * | 9/2012 | Creel .......... G06F 11/3672 717/128 |
| 2014/0280334 A1 * | 9/2014 | LeBlanc .......... G06F 21/6227 707/770 |

* cited by examiner

Browse Help

⊟ Set Up Your
  Organization
    Company Information
    Overview
    Required Domains
    ⊡ The Setup Menu
    Understanding
    Language, Locale, and
    Currency
    About Fiscal Years
    ⊡ Set Up Search
    ⊡ State and Country
      Picklists
    Customizing User
    Interface Settings
    Critical Updates
    Overview
    Divisions Overview
⊞ Manage Users
⊞ Manage User Access to
  Data
⊞ Import Your Data
⊞ Manage Data
⊞ Manage Duplicate
  Records
⊞ Security
⊞ Monitor Your
  Organization
⊞ Configure Salesforce
  Mobile Apps
⊞ Install Packages and
  Manage Apps
  Printable Resources for
  Administration
  Videos for Salesforce
  Administrators Sell to Your Customers
Welcome, Sales
Professionals
⊞ Managing the People
  and Organizations You
Sell To
⊞ Campaigning and
  Generating Leads
⊞ Managing Activities,
  Communities, and

Glossary
Downloadable User
Guides

Open Charts Salesforce — 405

Open Charts

Open Charts enables you to customize your reports, by using any chart engine to display charts in the Salesforce interface.
 Available In: All editions except Database.com Note
  Open Charts is currently available through a pilot program. For information on enabling Open Charts for you organization,
  contact salesforce.com.

Use Open Charts to display third-party or custom charts in Saleforce. For example, you can NVD3 charts and use them in place of
the standard Saleforce charts.
Once you've configured Open Charts, they are available to use in the following places:

- Reports
- Visualforce pages
- Detail pages

For example, if you've added Open Charts to your organization, when you edit report charts, you'll be able to use the new chart types
you've added.

410

Chart Editor                                               Help for the Page ⓘ ✕

Select Type: [icons]

| Chart Data | Formatting |

●Stacked ○Stream ○Expar

Summary 1 [Sum of Amount ▼]
Grouping 1 [Close Date ▼]
Grouping 2 [Stage ▼]
Combination  ☐ Plot additional values
Charts

[chart preview: December 2011 – April 2012, Class Data, Sum of Amount 0.00–240,000.00]

[ OK ]  [ Cancel ]

To configure Open Charts, you'll need to enter information about your chart engine and configure each type of chart that you'd like to use.

1. Contact salesforce.com Customer Support to enable Open Charts.
2. From Setup, click Customize | Reports & Dashboards | Visualization Plug-Ins.
3. Click New Visualization Plug-In.
4. Fill in the following general information about the chart engine:
   - Name of the chart engine
   - Description of the chart engine
   - Icon for he chart engine
5. Click Add Type and enter the following information for each chart type that you'd like to use:
   - Name of the chart type
   - Icon for the chart type
   - A JavaScript toolstrap method that maps Salesforce data to the charting enine format
6. Click Add Resources to upload all the JavaScript and CSS resources files you need for your charts. For example, you might need to
   add one resource file for your chart engine, one for each chart type, plus any CSS fies used by your charts. Resources can be
   selected from the static resources that you've already added to your organization. To add a new static resource, from Setup, click

Visualization Plug-In Detail [Edit] [Delete]       415

NVDS

NVD3 Charts                    Description

Created by  AdminUser 4/14/2014 11:19 AM    Last Modified By AdminUser 4/14/2014 11:19 AM ▼ Types

| | Name | Javascript Bootstrap Method |
|---|---|---|
| | DiscreteBarChart | renderDiscreteBarChart |
| | DonutChart | renderDonutChart |
| | Horizontal MultiBarChart | renderHorizontalMultiBarChart |
| | PieChart | renderPieChart |
| | StackedAreaChart | renderStackedAreaChart |

▼ Resources

| Name | Type | Rank |
|---|---|---|
| NvD3Css | CSS | 0 |
| d3v3 | JS | 1 |
| nvd3 | JS | 2 |
| axis | JS | 3 |
| historicalBarChart | JS | 4 |
| historicalBarChart | JS | 5 |
| utils | JS | 6 |
| DiscreteBarChart | JS | 7 |
| DonutChart | JS | 8 |

The following example shows a JavaScript resource file that implements and NVD3 donut chart. The function takes Salesforce data and metadata for the report an maps it to the chart format required by NVD3. It then renders the NVD3 donut chart into an HTML <div> element. The render DonutChart function receives three arguments:

- A JSON object that contains report data and metadata. For more information about the format of the Salesforce data, and the "Reports Namespace" section of the Force.com Apex Code Developer's Guide.
- The size, which is an array that contains the width and height of the chart type.
- The HML <div> element in which the chart type will be rendered.

420

```
function renderDonutChart(myJSONObject, size, div) {
    var groupingKey = myJSONObject. reportMetadata.groupoingsDown (0).name/
    var groupingLabel =
        myJSONObject.reportExtendedMetadata.groupingColumnInfo(groupingKey).label,
    var aggregationArray = myJSONObject.reportMetadata.aggregates/
    var aggregationKey = myJSONObject.reportMetadata.aggregates[0],
    var aggregationLabel =
        myJSONObject.reportExtendedMetadata.aggregateColumnInfo(aggregationKey).label,
    var groupingsJSON = myJSONObject.groupingsDown.groupings;
    var aggregationJSON = myJSONObject.factNap,
    var data = [],
    var groupings = [], for ( var 1 = 0, 1 < groupingsJSON.length, i++) {
        var grouping = JSON.stringify (groupingsJSON(±].label);
        grouping = grouping.substring(1, grouping.length = 1);

var key = JSON.stringify(groupingsJSON[i].key) - substring (1,
            JSON.stringify(groupingsJSON[i].key).length = 1)
            + "|T";
        data.push({
            "label" : grouping,
            "value" : parseInt(aggregationJSON[key].aggregates[0].value)
        ));
    };

var chartFormat = {
        height: size[1],
        width: size[0]
    };
    renderDonut (data, div, chartFormat);
```

Open Charts (Pilot)

```
);

function renderDonut (data, div, chartFormat)  {
    nv.addGraph(function(){ ( var  chart = nv.models.pieChart()
            .x(function(d) (return d.label))
            .y(function(d) (return d.value))
            .height(chartFormat.height)
            .showLabels(true)
            .labelThreshold(.05)
            .donut(true)
            .donutRatio(0.35);

var  svg = d3.select(div).append("svg:avg")
            .attr({
                "width": chartFormat.width,
                "height": chartFormat.height
            })};

d3.select('dive svg')
            .datum(data)
            .transition(
            .duration(1000)
            .call(chart);
        return chart;
    )};
};
```

FACILITATING DYNAMIC CUSTOMIZATION OF REPORTING TOOLS IN AN ON-DEMAND SERVICES ENVIRONMENT

CLAIM OF PRIORITY

This application claims the benefit of and priority to U.S. Provisional Patent Application No. 62/062,721, entitled FACILITATING A DYNAMIC CHARTING FRAMEWORK FOR INTEGRATION OF CHARTING ENGINES IN AN ON-DEMAND SERVICES ENVIRONMENT, by Arunkumaran Varadharajan, et al., filed Oct. 10, 2014, and the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to facilitating dynamic customization of reporting tools in an on-demand services environment.

BACKGROUND

Conventional reporting techniques lack integration qualities and thus limit the users to accessing and using only the reporting features offered by the local reporting tools.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

FIG. 4 illustrates a screenshot representing a user interface offered by a reporting tool according to one embodiment;

SUMMARY

Figure 1:
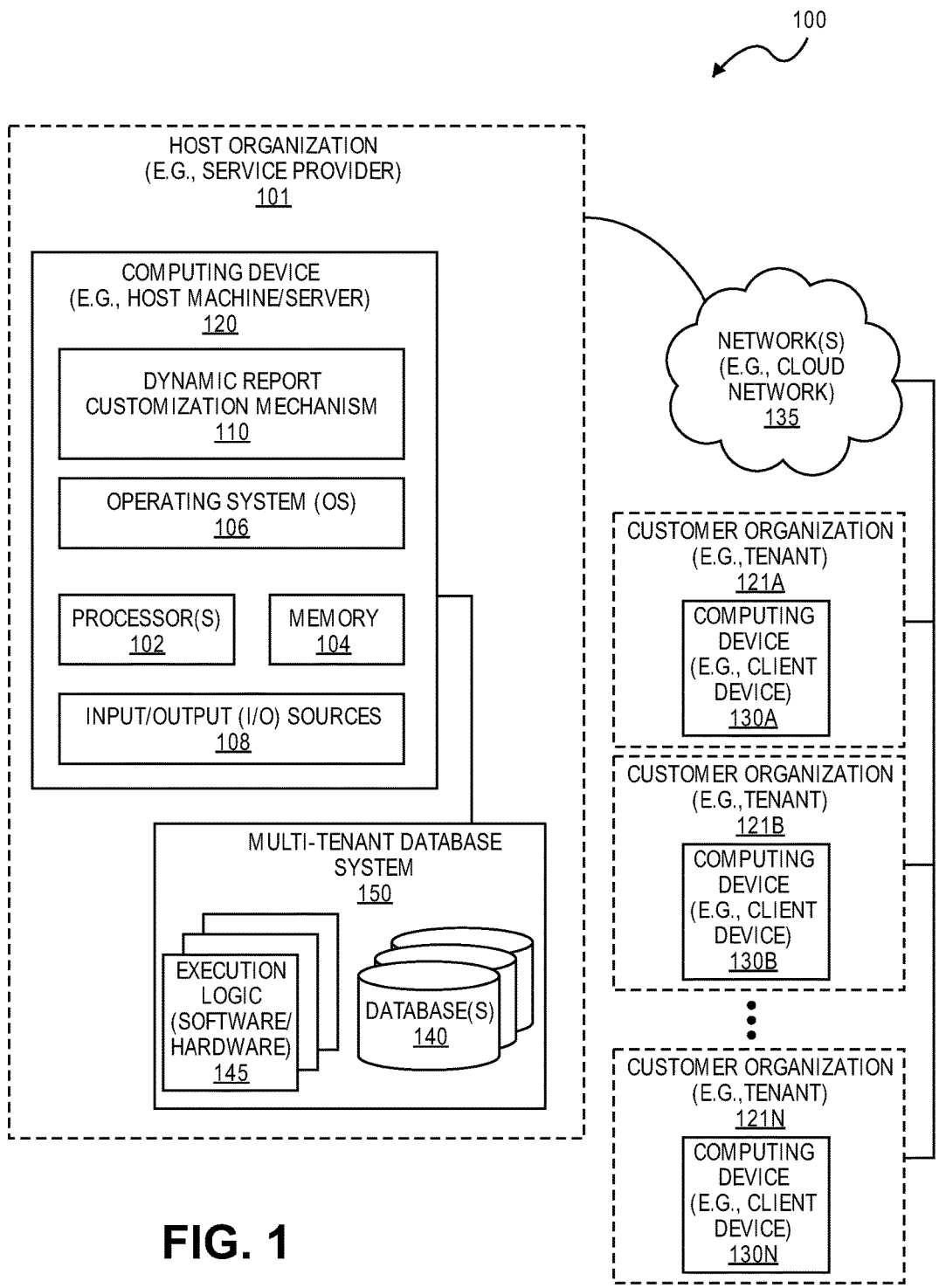
FIG. 1 illustrates a system having a computing device employing a dynamic report customization mechanism according to one embodiment.

In accordance with embodiments, there are provided mechanisms and methods for facilitating dynamic customization of reporting tools in an on-demand services environment in a multi-tenant environment according to one embodiment. In one embodiment and by way of example, a method includes importing, by a database system, a first application from a computing system associated with a third-party entity, where the first application is associated with the third-party entity and first one or more reporting forms of a plurality of reporting forms. The method may further include integrating, by the database system, the first application with a second application to generate an integrated application, where the second application includes a local application and is independent of the first application. The second application may be associated with second one or more reporting forms of the plurality of reporting forms. The method may further include associating, by the database system, a set of integrated properties of the integrated application with a reporting tool, and displaying, by a display device, the reporting tool to be used to facilitate building of one or more reports based on the set of integrated properties, where the one or more reports include at least one of the first and second one or more reporting forms.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating tenant-based customization of access and security controls in an on-demand services environment in a multi-tenant environment according to one embodiment.

Embodiments provide for a technique for integration of varying reporting properties that may not be compatible with each other that is capable of offering user-controlled dynamic customization of reporting tools to generate, view, play, modify, etc., any number and types of reports, including charts, tables, etc.

For example and in one embodiment, a pluggable visualization technique is offered to give various users (e.g., software developers, system administrators, end-users, etc.) the ability to package up their own visualization libraries, such as a combination of local and imported libraries, such as from an independent software vendor (ISV), to obtain customized reports using a local platform or stack (e.g., Salesforce stack), such as through a Visualforce® page, embedded into details page, and dashboards, etc., including during creating, printing, and viewing of reports. In one embodiment, a package structure is provided to define new plugins, an administrative page to create plugins, a report create to crate user interface (UI) support, etc., along with offering other server/client rendering support.

It is contemplated that embodiments and their implementations are not merely limited to multi-tenant database system ("MTDBS") and can be used in other environment, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a dynamic report customization mechanism 110 according to one embodiment. In one embodiment, computing device 120 includes a host server computer serving a host machine for employing dynamic report customization mechanism ("report mechanism") 110 for facilitating pluggable visualization for integration of varying reporting engines for customization of reports in a multi-tiered, multi-tenant, on-demand services environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc.), etc., serving as a customer or client of host organization 101 (also referred to as "service provider" or simply "host") (e.g., Salesforce®) serving as a host of report mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitation) one or more of customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 100 may include (without limitation) server computers (e.g., cloud server computers, etc.), desktop computers, cluster-based computers, set-top boxes (e.g., Internet-based cable television set-top boxes, etc.), etc. Computing device 100 includes an operating system ("OS") 106 serving as an interface between one or more hardware/physical resources of computing device 100 and one or more client devices 130A-130N, etc. Computing device 100 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
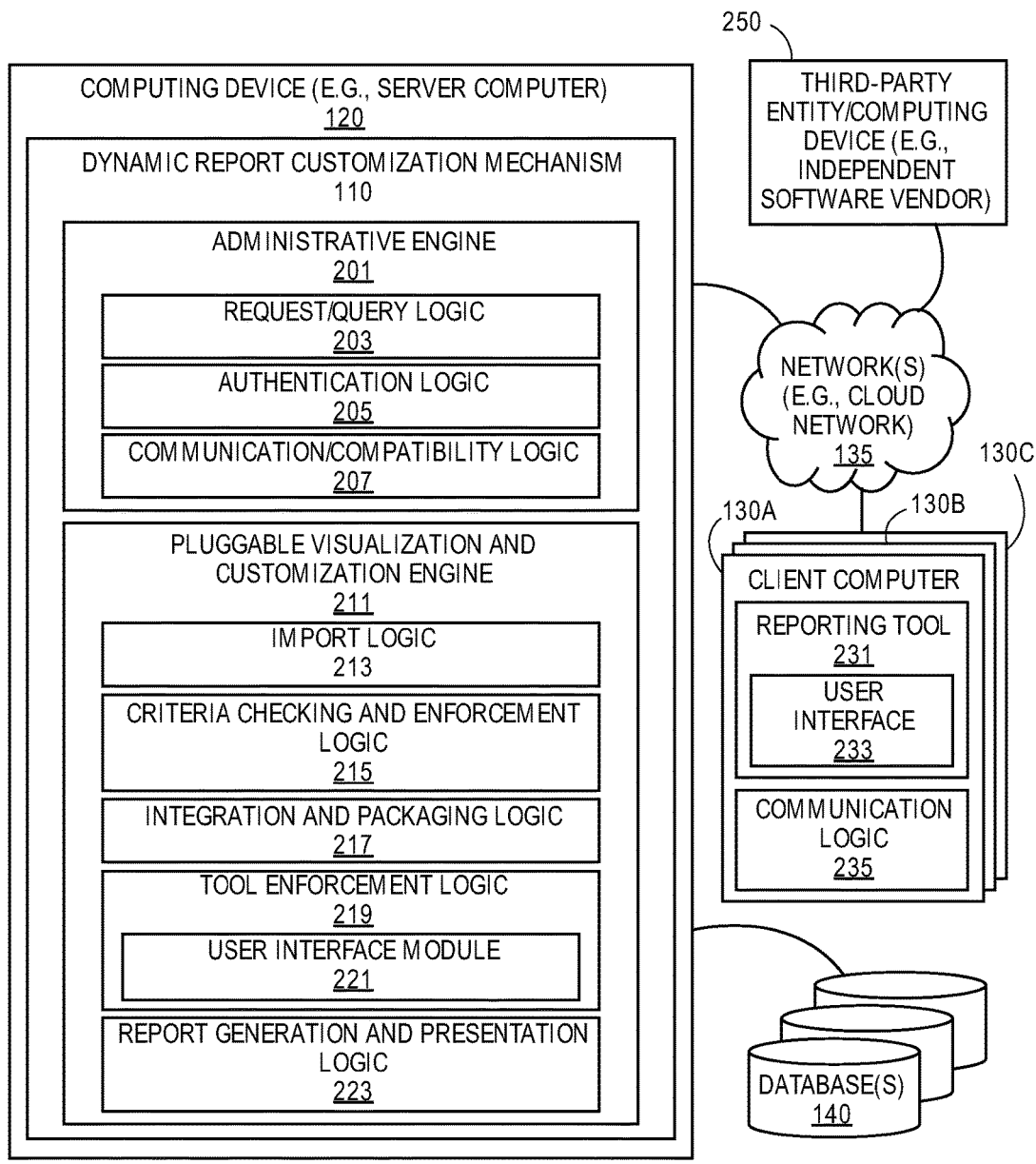
FIG. 2 illustrates a dynamic report customization mechanism according to one embodiment.

FIG. 2 illustrates a dynamic report customization mechanism 110 according to one embodiment. In one embodiment, report mechanism 110 may include any number and type of components, such as administration engine 201 having request/query logic 203, authentication logic 205, and communication/compatibility logic 207. Similarly, control mechanism 110 may further include pluggable visualization and customization engine ("pluggable engine") 211 having import logic 213, criteria checking and enforcement logic ("criteria logic") 215, integration and packaging logic ("integration logic") 217; tool enhancement logic ("tool logic") 219 including user interface module 221; and report generation and presentation logic ("report logic") 223.

As illustrated with respect to FIG. 1, computing device 120 may be in communication with database(s) 140 and client computers 130A-N over network(s) 135. In one embodiment, each client computer 130A-N may include a reporting tool, such as reporting tool 231 at client computer 130A, which is accessible to users via a user interface, such as user interface 233 at client computer 130A, allowing the users to access and use various features of report mechanism 110 as will be described throughout this document. Further, the user may have access to one or more websites, such as website 237 at client computer 130A, to view, choose, and import one or more reporting applications being developed by and obtained through third-party development entity ("third-party entity" or "ISV") 250. Each client computer 130A-N may further include communication logic, such as communication logic 235 at client computer 130A, for communicating with server computer 100 and its report mechanism 110 over network(s) 135, such as a cloud network.

Throughout this document, terms like "framework", "mechanism", "engine", "logic", "component", "module", "tool", and "builder" may be referenced interchangeably and include, by way of example, software, hardware, and/or any combination of software and hardware, such as firmware. Further, any use of a particular brand, word, or term, such as "access control" or "security privileges", "node", "pod" or "Superpod", "OwnerID" or "UserSessionID", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of one or more client devices 130A-N, code execution requests, and so forth.

In one embodiment, computing device 120 may implement request/query logic 203 to serve as a request/query interface via a web server or as a stand-alone interface to receive requests packets or other requests from the client devices 130A-N. The request interface may further support the return of response packets or other replies and responses in an outgoing direction from computing device 120 to one or more client devices 130A-N.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via one or more client devices 130A-N.

In one embodiment, computing device 120 may include a server computer which may be further in communication with one or more databases or storage repositories, such as database(s) 140, which may be located locally or remotely over one or more networks, such as network(s) 235 (e.g., cloud network, Internet, proximity network, intranet, Internet of Things ("IoT"), Cloud of Things ("CoT"), etc.). Computing device 100 is further shown to be in communication with any number and type of other computing devices, such as client computing devices 130A-N, over one or more networks, such as network(s) 140.

In one embodiment, pluggable engine 211 may be used to perform any number and type of tasks to ensure integration and use of various reporting engines that may be independent of and incompatible with each other to provide users (e.g., developer, end-user, etc.) representing their tenants (e.g., organizations) with a number of options or abilities to modify their existing capabilities for generation and presentation of reports without having to depart from or give up their local system, framework, platform, support, and other services, etc.

For example and in one embodiment, this may be achieved through pluggable visualization that is provided through and supported by the existing framework, such as Visualforce® by Salesforce®, development platform (such as Force.com® by Salesforce.com®), applications, services, etc. For example, with pluggable visualization as facilitated by report mechanism 110, a user is provided the ability to package up or put together their own set of visualization libraries that can be seen through or used with existing framework, platform, etc., when wanting to visualize a report whether it be through a particular page framework-supported page (e.g., Visualforce® page), embedded into detail pages, dashboards, and during report creation, printing and viewing, etc. This, in one embodiment, is provided through report mechanism 110 which serves to facilitate a package structure having the ability to define plugins, provide administrative tools, generate relevant UIs, and offer other client and/or server rendering support.

In one embodiment, import logic 213 may be used to import external applications, including visualization libraries, etc., from one or more external sources. For example, in one embodiment, an imported application may be a reporting or charting application or simply include a combination or collection of visualization libraries having being developed by an external source, such as third-party entity or ISV 250. In one embodiment, import logic 213 may provide the user access to any number and type of reporting applications being developed and provided by one or more ISVs 250 which may be accessed by a user using a service provider's website (e.g., AppExchange by Salesforce®, etc.) offering a marketplace for applications. For example, a user associated with client computer 130A may access website 237, such as an ISV-based website or a service provider-based website (e.g., Salesforce.com), providing access to ISV-developed reporting applications, etc., to access and import a reporting application from website 237 to then be used for reporting purposes, such generating and visualizing charts, graphs, tables, etc., as desired or necessitated.

It is contemplated that ISV 250 may be engaged in a business contract with a service provider (e.g., Salesforce®), where certain software development projects may be outsourced by the service provider to ISV 250 and thus, the service provider may require ISV 250 to comply with the service provider's criteria such that any products developed by ISV 250 may remain in full compliance with various requirements, standards, protocols, platforms, etc. These criteria may range from anywhere from an ethical requirement to a platform standard, etc. In one embodiment, ISV 250 may be used to develop an entirely new or separate product or in some cases, ISV 250 may be relied upon to develop certain new features which may be in addition to or support of an already existing product provided by the service provider.

For the sake of brevity, clarity, and ease of understand, let us suppose that a default reporting application, such as a charting application for providing charts or graphs to represent reporting data, may be offered by a service provider to the user associated with computing device 130A via reporting tool 231. However, charting application may only be capable of offering a limited number or type of charts, such as line charts and bar charts, through their default visualization libraries but may not offer other forms of charts, such as pie charts. Now, for example, if the user wishes to have a pie chart without having to leave the framework of the service provider, the user may obtain an ISV-developed product having visualization libraries to support bar charting from an ISV-based website, such as website 237. As will be further described later in this document, in one embodiment, using one or more components of report mechanism 110, these imported pie charting visualization libraries may then be integrated with the default visualization libraries and provided through reporting tool 231 and accessible to the user via user interface 233.

In one embodiment, ISV 250 may be expected and required to comply with the service provider's criteria before any of their products are made available through website 237; however, in another embodiment, once a product (e.g., product with pie chart visualization libraries) is triggered to be imported by import logic 213, the product may then be verified to have complied with the service provider's criteria using criteria logic 215. If one or more criterion is not met, the product may be rejected and its importation declined, while the user may be informed of the decision through a notification. In contrast, if the product satisfies the criteria, it may be imported using import logic 213.

In one embodiment, once the product is imported, integration logic 217 may then be triggered to integrate and package the imported product with the default product to generate integrated package. In other words, continuing with the above example, using integration logic 217, a visualization plug-in object of the imported product may be plugging into an existing chart setting dialog, such as integrating the imported visualization libraries using the visualization plug-in's various parts, such as strings (e.g., name, description), icon (e.g., static resource), where the visualization plugin may be regarded as a root object of the plugin relating to the imported product and that all other objects can hang off and provide a name, description, and icon for display purposes using user interface 233. In some embodiments, an imported product may not be directly integrated with any default product and merely made to function with a default framework to provide the imported functionalities while remaining true to any default protocols and services.

In one embodiment, once the imported product is integrated or packed with one or more of the default product, platform, etc., each entity or object of the imported product may then be plugged into the current or default components for communication, visualization, display, etc., to provide for enhanced reporting tool 231 and UI 233, etc., as facilitated by tool logic 219 and user interface module 221, respectively, and as illustrated with respect to FIG. 4. For example, tool logic 231 is used to generate and associated enhancements to a default reporting tool to create and provide an enhanced reporting tool, such as reporting tool 231, which allows for the user to achieve all the benefits and privileges of using the imported product, such as its visualization libraries, within the environment provided by the service provider (e.g., Salesforce) and its various frameworks (Visualforce®), platforms (e.g., Force.com®), etc., through an enhanced tool and user interface, such as reporting tool 231 and UI 233, respectively.

In some embodiments, as illustrated in FIG. 4, reporting tool 231 may be user-friendly in that it may provide various user-friendly features for navigation and use, where such features may include (without limitation) drop-down menus, cut-and-paste, copy-and-paste, single and double click options, left and right click, varying colors and backgrounds, help menu, and various other menu options, like, file, view, edit, etc. Similarly, in one embodiment, UI 233 may include a Graphical User Interface (GUI)-based interface with or without interaction capabilities, etc.

With regard to plugging in or packing up of visualization entities or objects of the imported product, such visualization entities or portions may include (without limitation) visualization plugin (e.g., VisualizationPlugin), visualization type (e.g., Visualization Type), visualization resource (e.g., VisualizationResource), visualization data component metadata (e.g., VisualizationDataComponentMetadata) or visualization metadata (e.g., VisualizationMetadata), visualization setting metadata (e.g., VisualizationSettingMetadata), and/or the like. As with visualization plugin, visualization type may include (without limitation) string (e.g., name, description), static resource (e.g., file plugin), picklist (e.g., type), integer or simply "int" (e.g., rank), etc. For example, visualization type may refer to a definition of a single chart type and may point to a plugin or another visualization type. The sub-type ability may allow packaging of slightly different chart types into one type (e.g., grouped and stacked bar being packaged as just currently-offered bar carts). Further, for example, given the need for both the client-side rendering and the server-side for printing both a Java® script (e.g., javascript) render method as well as an optional apex class for rendering an image. If no apex class is provided, then a fallback chart type may be provided that matches the same grouping/aggregation needs. A minimum version is also applied in order to fallback the image format if the javascript rending may fail.

Similarly, visualization resource refers to an object that includes static resources for visualization, such as javascript or Cascading Style Sheet (css) files, where these may be attached to both the visualization type the entire plugin which ensures it is loaded with each visualization type. Visualization type may include (without limitation) string (e.g., name, description), static resource (e.g., file plugin), and picklist (e.g., type), int (e.g., rank), etc.

Similarly, visualization data component metadata may refer to an object that is connected to visualization type and used to define the data needs of a visualization library. Further, visualization data component metadata may be used for either groupings or aggregations and can be optional while defining a name and setting position for display purposes. Visualization data component metadata includes a rank that defines the level in report and further includes (without limitation) string (e.g., name), int (e.g., setting position or rank), book (optional or, e.g., enables sub types), picklist (e.g., type), etc.

Moreover, visualization setting metadata may define the options that a user may have available to define a chart, where these options may be general enough to support what currently exists, etc., and these options may be set hardcore to what exists with the intent to expand in the future. Visualization setting metadata may include (without limitation) string (e.g., name, int (e.g., setting position), and picklist (type, textbox, colorpicker, checkbox, gradient, fontsize, position, range, etc.), etc. Similarly, various entities or objects may be employed and use to achieve dynamic activities on dashboard, such as by having one or more options like guage ranges, bool, etc., that are entirely dedicated to the dashboard.

Referring back to components of report mechanism 110, report logic 223 may be used to comply with and enforce the newly imported product as well as the default product to provide the user the ability to use both through reporting tool 221. For instance, continuing with a previously-stated example, the user may access and use reporting tool 221 via user interface 223 to generate not only the default form of charts (e.g., line chart and bar chart), but also a new form of chart, such as pie chart, as provided by the imported product having the relevant visualization libraries and as facilitated by report logic 223. In other words, for example, report logic 223 may facilitate any number and type of processes and components to ensure the generation and presentation of both the default and imported reporting charts via reporting tool 221 at client computer 130A.

For example, an embedded report chart (e.g., embeddedReportChart) aura component may be used to provide a consistent behavior across the entire reporting application, including imported and/or default libraries, to support any number of reporting or charting forms, such as image maps, pop charts, etc., and may provide additional types by relying on other components, such as javascript/css dependencies, bootstrap method, JavaScript Object Notation (JSON), etc. Further, there may also be a number of callbacks to inform the reporting application to forward date to the report page, report an error, etc.

Similarly, for example, report logic 223 may facilitate the rendering of a chart through one or more processes, such as (without limitation) load a common iframe page from a domain (e.g., Force.com) with a unique identification (id) as a parameter after the hash (e.g., "<url>#id=<id>"), wait for "<id>:ready" message from iframe, post a message (e.g., postMessage) to iframe with data and dependencies, wait for error or drill messages ("<id>:error:<error message>", "<id>:drill[:<filterJson>]"), and on refresh, if same plugin, post new message with new data, or if different plugin, reload iframe, wait for ready and post new data. Further, with regard to iframe, after load, post message (e.g., "ready") to parent that it is ready for data, listen for chart data from parent, once received, load dependencies one-by-one in order, and call init method with data and callbacks for drill and error.

The width of the iframe may be somewhat (e.g., 2 pixels) wider than the corresponding chart size as the border that is typically included in charts may be eliminated. Similarly, the height of the iframe may be calculated to be a certain percentage (e.g., 74%) of a typical height. Moreover, in some embodiments, report logic 223 may be used to provide a callback method, such as in the bootstrap, to allow for a plugin to display errors in the expected format and further, to drill into a report and focus the filter based on user actions. Further, as aforementioned, using report logic 223, charts may be rendered with any number and type of processes and components, such as embedded report chart aura component, to support and facilitate various activities and tasks, such as report run page, report builder, etc., convert chart points to Application Programming Interface (API) JSON format and pass to a component, provide fallback charting for older browsers and similarly, use headless browsers to render on a server computer. Further, any number and type of additional features may be offered, such as data clipping feature to dynamically filter out or remove unwanted or unused data from reaching the user.

Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

It is contemplated that any number and type of components may be added to and/or removed from control mechanism 110 to facilitate various embodiments including adding, removing, and/or enhancing certain features. It is contemplated that embodiments are not limited to any particular technology, topology, system, architecture, and/or standard and are dynamic enough to adopt and adapt to any future changes.

Figure 3:
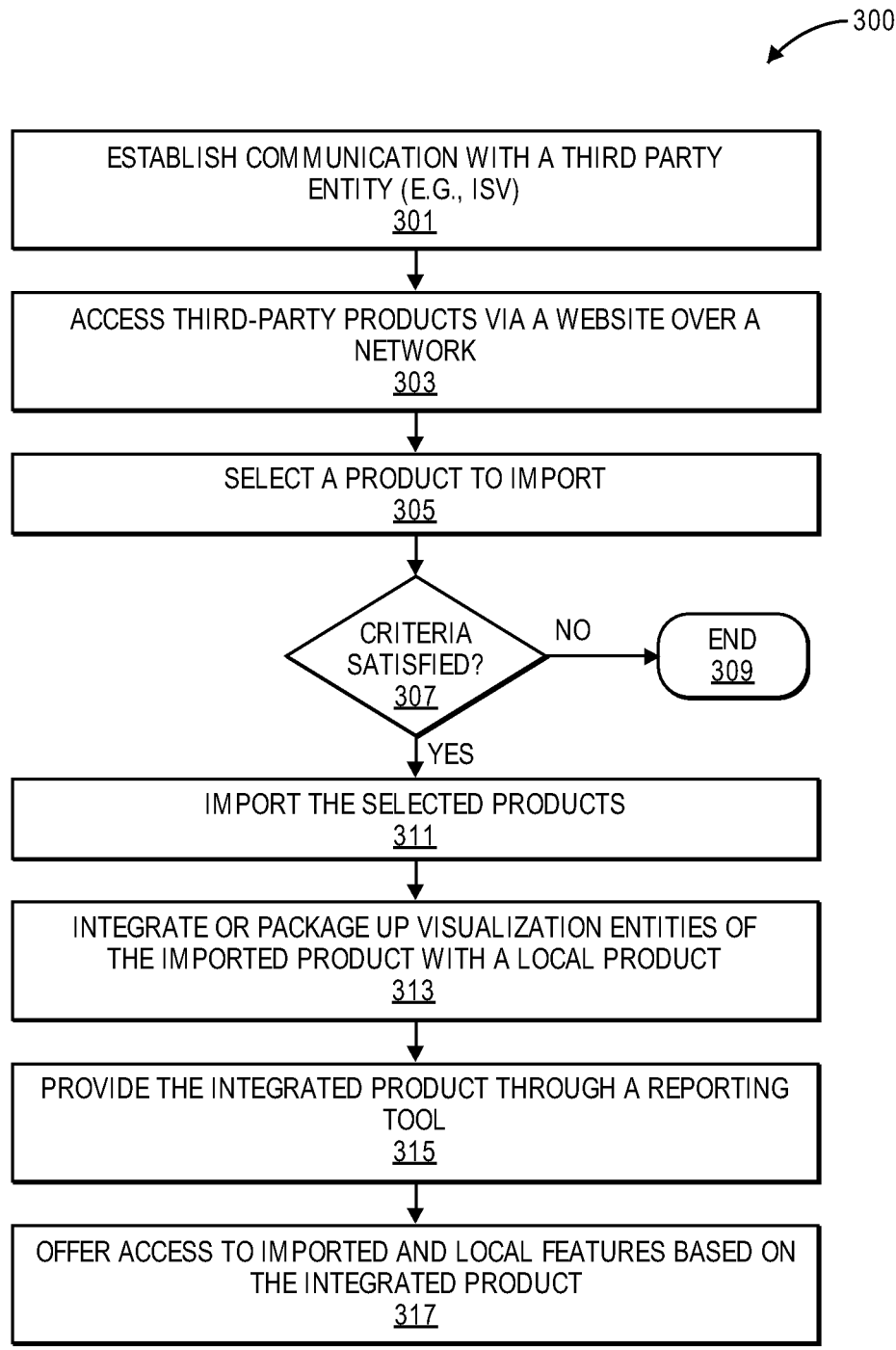
FIG. 3 illustrates a method for facilitating dynamic access and security controls according to one embodiment.

FIG. 3 illustrates a method 300 for facilitating dynamic access and security controls according to one embodiment. Method 300 may be performed by processing logic that may comprise hardware (e.g., circuitry, dedicated logic, programmable logic, etc.), software (such as instructions run on a processing device), or a combination thereof. In one embodiment, method 400 may be performed or facilitated by one or more components of control mechanism 110 of FIG. 2. The processes of method 300 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3 may not be repeated or discussed hereafter.

Method 300 starts with block 301 with establishing communication between a client computer with a third-party entity (such as ISVs, outsourcing software developers, etc.) through a website provided by a service provider (such as Salesforce®), where the service provider remains in communication with both the client computing device and the third-party entity. In one embodiment, the service provider's website may represent a service provider-sponsored marketplace (such as AppExchange® by Salesforce® at appexchange.salesforce.com) that provides a list of software products (e.g., software applications, upgrades, libraries, etc.) offered by the third-party entity, where, in another embodiment, the website may provide a direct link to a website associated with the third-party entity where the products may be offered. These applications may include any number and type of applications, such as reporting applications, charting applications, data presentation applications, etc., which may be developed by the third-party entity for the benefit of the service provider's customers (e.g., tenants representing organizations) and in accordance with the criteria set forth by the provider.

At block 303, a user (e.g., software developer, system administrator, and/or end-user, such as an employee, including an executive, a sales associate, an administrative assistant, etc.) representing a tenant (e.g., business organization, company, government agency, educational institution, non-profit entity, etc.) and associated with the client computer may access, over a network (e.g., cloud network, Internet), any number and type of software products (e.g., reporting offered by the third-party entity at or using, for example, a website-based marketplace associated with the service provider.

Continuing with reporting-based applications/products, as aforementioned and discussed throughout the document, the user may have access to any number and type local products, such as service provider-based reporting products which may be accessed and used by the user to obtain any number and type of reports, charts, graphs, data presentations, etc. However, for example, the user may wish to obtain other reporting features that are not offered or only partially offered by the service provider-based reporting products and accordingly, the user may choose to access the relevant website and select and import such a product at block 305. For simplicity, for example, the local product may be limited to offering certain types of charts, such as line chart, bar chart, etc., but the user may wish to obtain a third-party product to be able to view, for example, pie charts, etc. It is contemplated that embodiments are merely limited to these or any particular number and type of charts or reporting documents, and/or the like.

As previously discussed, all third-party products are expected to be in compliance with any service provider criteria prior to being offered on the website; nevertheless, in one embodiment, at block 307, any product selected for importation may be checked for compliance with the service provider's criteria. If one or more criterion of the criteria is not satisfied, the importation request is denied and the process end at block 309. If, however, the criteria are satisfied, the product is imported at block 311.

At block 313, for example and in one embodiment, in case of the imported software product being a reporting product, such as a charting product, any imported visualization components/entities (e.g., imported visualization libraries) of the imported product may be integrated or packaged up with any local visualization components/entities (e.g., local visualization libraries) of the local product to generate an integrated reporting product having the ability to offer both the local and now imported reporting features, charts, etc.

At block 315, in one embodiment, the integrated product is provided through a reporting tool that, in one embodiment, may be sufficiently enhanced to provide the user access to various features of the integrated/packaged reporting product at the client computer. In on embodiment, the enhanced reporting tool may be a software application (e.g., website) having any number and type of relevant features and components, such as an enhanced user interface (e.g., GUI), to provide the user access to the integrated product with the ability to access any number and type of local and imported features, such as data charts, reports, tables, etc., as offered by the integrated product. At block 317, in one embodiment, once the access to the integrated product is established through the reporting tool, various generation and presentation options may be offered so that the user may request, generate, edit, play, view, etc., any number and type of local and imported features using the reporting tool and via the user interface.

FIG. 4 illustrates a screenshot 400 representing user interface 233 offered by reporting tool 231 of FIG. 2 according to one embodiment. As an initial matter, for the sake of brevity, clarity, and ease of understanding, any number of processes and components discussed above with reference to FIGS. 1-4 are not discussed or repeated hereafter. In the illustrated embodiment, screenshot 400 represents a GUI with any number and type components and features, such as drop-down menu, etc., that are facilitated by reporting tool 231 of FIG. 2. For example and in one embodiment, user interface 233, as illustrated here in screenshot 400, may be a webpage of a website which may be obtained by simply entering the relevant website address (such as using a Uniform Resource Locator (URL)) in a web browser.

As illustrated, any number and type of reporting features may be provided by reporting tool 231 of FIG. 2, such as open charts 405 which then provide additional features and tools to perform any number and type of reporting-relating tasks, such as allowing for customization of reports, visual pages, charts, detail pages, tables, graphs, etc., as described throughout this document. Further, chart editor 410 represents and serves as a simply editing tool for editing of reports, charts, etc.

As further illustrated, in one embodiment, as facilitated by one or more components of report mechanism 110 of FIG. 2, visualization plugin details section 415 may be provided to offer a set of features (e.g., charting features, reporting options, etc.) based on various visualization libraries and/or other visualization entities of the imported product integrated into a default product. Some of the charting features provided by visualization plugin details section 415, as illustrated here, may include (without limitation) discrete bar chart, donut chart, horizontal bar chart, stacked area chart, etc. The illustrated screenshot 400 further shows resource file 420, such as a javascript resource file, for implementation and use of the imported charting features. In is contemplated that embodiments are not limited merely to this screenshot 400 and/or other examples provided throughout this document and that such are provided for brevity, clarity, and ease of understanding.

Figure 5:
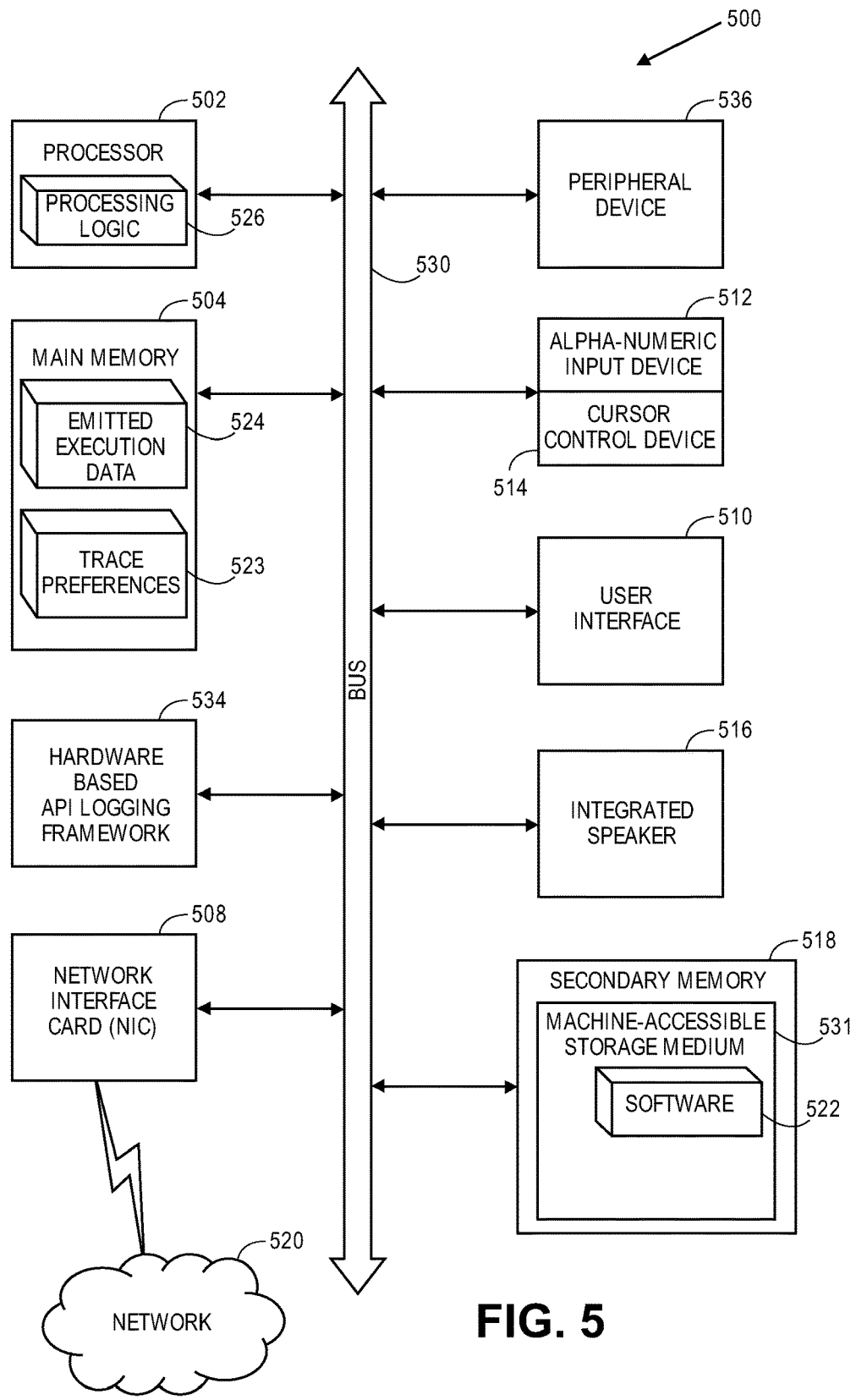
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network(s) 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of control mechanism 110 as described with reference to FIG. 1 other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of control mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
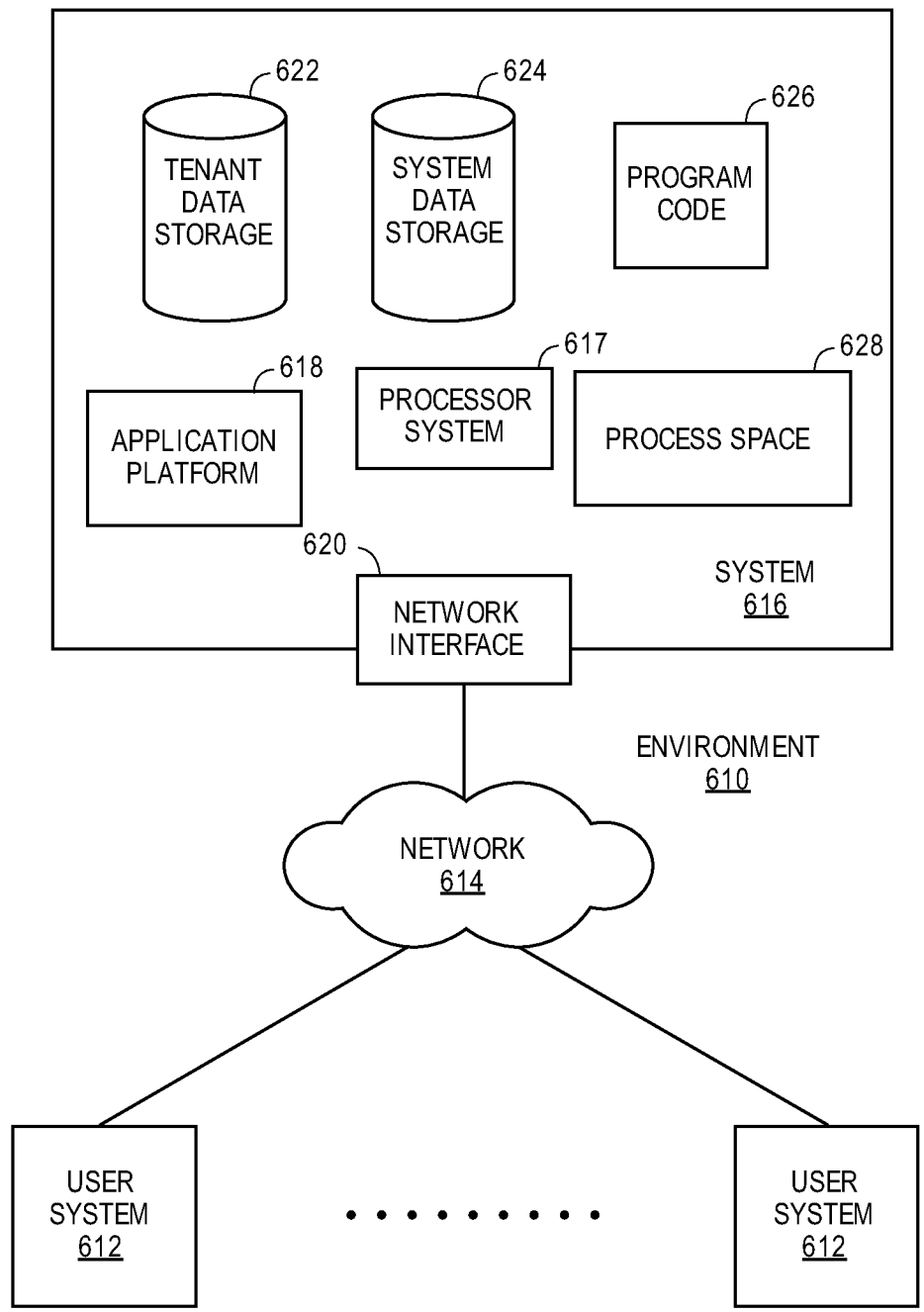
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
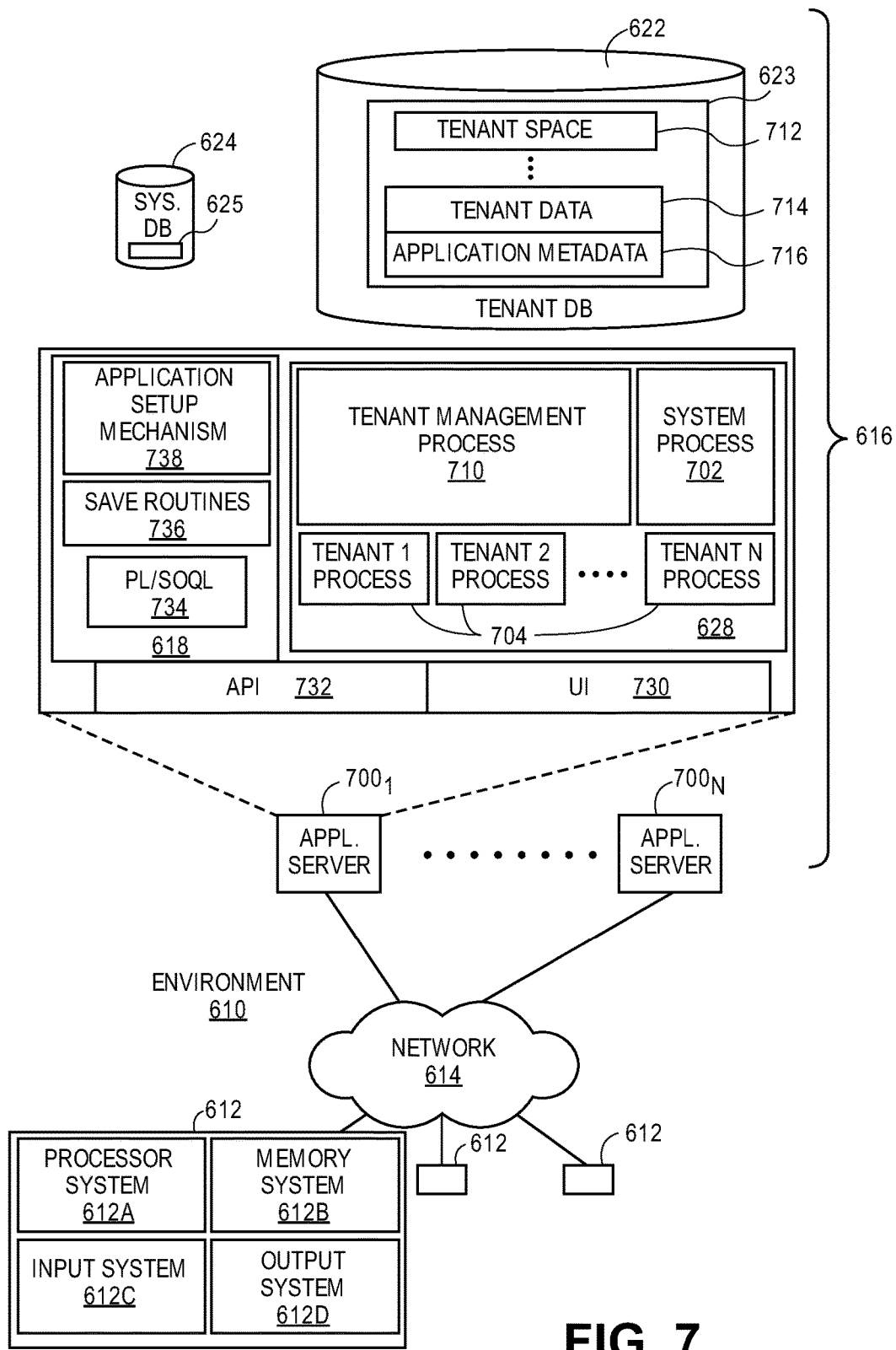
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 700$_1$-700$_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 700$_1$ might be coupled via the network 614 (e.g., the Internet), another application server 700$_{N-1}$ might be coupled via a direct network link, and another application server 700$_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A database system-implemented method comprising:
   importing, by a tool customization device, a first application associated with a first entity and compatible with a first reporting format of a plurality of reporting formats;

integrating, by the tool customization device, first properties of the first application with second properties of a second application to generate an integrated application serving as a third application having integrated properties, wherein the third application is independent from the first application and the second application, wherein the second application is associated with a second entity and compatible with a second reporting format of the plurality of reporting formats, wherein the first properties include one or more of first functionalities and one or more first libraries associated with the first application, and the second properties include one or more of second functionalities and one or more second libraries associated with the second application;

customizing, by the tool customization device, a reporting tool by associating the integrated properties of the integrated application with the reporting tool; and facilitating, by the tool customization device, access to the reporting tool through the integrated application to build one or more reports based on one or more of the first and second reporting formats.

2. The method of claim 1, further comprising checking first criteria associated with the first entity against second criteria associated with the second entity.

3. The method of claim 2, further comprising:
declining importing of the first application, if one or more criterion of the criteria is not satisfied by at least one of the first application and the first entity, wherein the first entity to facilitate development of the first application; and
allowing importing of the first application, if the criteria is satisfied.

4. The method of claim 1, wherein the integrated properties comprise the first properties associated with the first application and the second properties associated with the second application.

5. The method of claim 4, wherein the first properties comprise imported features having imported visualization properties including imported visualization libraries to support one or more imported reporting features relating to a first reporting format, wherein the second properties comprise local features having local visualization properties including local visualization libraries to support one or more local reporting features relating to a second reporting format.

6. The method of claim 5, wherein the imported features associated with the first application are independent of the local features associated with the second application, wherein the imported and local features are provided via the integrated properties of the integrated application.

7. The method of claim 5, wherein the one or more reports comprise one or more of charts, graphs, tables, reports, and other data presentations.

8. A system comprising:
a processor and a memory, the processor to execute instructions at the memory to facilitate operations comprising:
importing a first application associated with a first entity and compatible with a first reporting format of a plurality of reporting formats;
integrating first properties of the first application with second properties of a second application to generate an integrated application serving as a third application having integrated properties, wherein the third application is independent from the first application and the second application, wherein the second application is associated with a second entity and compatible with a second reporting format of the plurality of reporting formats, wherein the second application includes a local application that is independent of the first application including a remote application, wherein the first properties include one or more of first functionalities and one or more first libraries associated with the first application, and the second properties include one or more of second functionalities and one or more second libraries associated with the second application;

customizing a reporting tool by associating the integrated properties of the integrated application with a reporting tool; and facilitating access to the reporting tool through the integrated application to build one or more reports based on one or more of the first and second reporting formats.

9. The system of claim 8, wherein the mechanism is further to check first criteria associated with the first entity against second criteria associated with the second entity.

10. The system of claim 9, wherein the operations further comprise:
declining importing of the first application, if one or more criterion of the criteria is not satisfied by at least one of the first application and the first entity, wherein the first entity to facilitate development of the first application; and allowing importing of the first application, if the criteria are satisfied.

11. The system of claim 8, wherein the integrated properties comprise the first properties associated with the first application and the second properties associated with the second application.

12. The system of claim 11, wherein the first properties comprises imported features having imported visualization properties including imported visualization libraries to support one or more imported reporting features relating to the plurality of reporting formats, wherein the set of second properties comprise local visualization properties including local visualization libraries to support one or more local reporting features relating to the second one or more reporting forms.

13. The system of claim 12, wherein the imported features are independent of the local features and provided via the integrated properties of the integrated application.

14. The system of claim 12, wherein the one or more reports comprise one or more of charts, graphs, tables, reports, and other data presentations.

15. A non-transitory machine-readable medium comprising a plurality of instructions which, when executed by a processing device, cause the processing device to perform operations comprising:
importing a first application associated with a first entity and compatible with a first reporting format of a plurality of reporting formats;
integrating first properties of the first application with second properties of a second application to generate an integrated application serving as a third application having integrated properties, wherein the third application is independent from the first application and the second application, wherein the second application is associated with a second entity and compatible with a second reporting format of the plurality of reporting formats, wherein the second application includes a local application that is independent of the first application including a remote application, wherein the first properties include one or more of first functionalities and one or more first libraries associated with the first application, and the second properties include one or more of second functionalities and one or more second libraries associated with the second application;

customizing a reporting tool by associating the integrated properties of the integrated application with a reporting tool; and facilitating access to the reporting tool through the integrated application to build one or more reports based on one or more of the first and second reporting formats.

16. The non-transitory machine-readable medium of claim 15, wherein the operations further comprise checking first criteria associated with the first entity against second criteria associated with the second entity.

17. The non-transitory machine-readable medium of claim 16, wherein the operations further comprise:

declining importing of the first application, if one or more criterion of the criteria is not satisfied by at least one of the first application and the first entity, wherein the first entity to facilitate development of the first application; and allowing importing of the first application, if the criteria are satisfied.

18. The non-transitory machine-readable medium of claim 15, wherein the integrated properties comprise the first properties associated with the first application and the second properties associated with the second application.

19. The non-transitory machine-readable medium of claim 18, wherein the first properties comprises imported features having imported visualization properties including imported visualization libraries to support one or more imported reporting features relating to the plurality of reporting formats, wherein the set of second properties comprise local visualization properties including local visualization libraries to support one or more local reporting features relating to the second one or more reporting forms.

20. The non-transitory machine-readable medium of claim 19, wherein the imported features are independent of the local features and provided via the integrated properties of the integrated application.

21. The non-transitory machine-readable medium of claim 19, wherein the one or more reports comprise one or more of charts, graphs, tables, reports, and other data presentations.

\* \* \* \* \*